United States Patent
Ely, III

(10) Patent No.: US 8,413,500 B2
(45) Date of Patent: Apr. 9, 2013

(54) BERNOULLI WIND PREDICTION SYSTEM

(76) Inventor: Richard Duncan Ely, III, Davis, CA (US)

( * ) Notice: Subject to any disclaimer, the term of this patent is extended or adjusted under 35 U.S.C. 154(b) by 842 days.

(21) Appl. No.: 12/321,469

(22) Filed: Jan. 20, 2009

(65) Prior Publication Data
US 2010/0180694 A1     Jul. 22, 2010

(51) Int. Cl.
*G01P 13/00* (2006.01)

(52) U.S. Cl.
USPC ............................. 73/170.01; 702/3

(58) Field of Classification Search ............ None
See application file for complete search history.

(56) References Cited

U.S. PATENT DOCUMENTS

| | | | | |
|---|---|---|---|---|
| 4,155,252 A | * | 5/1979 | Morrill | 73/170.08 |
| 5,372,039 A | * | 12/1994 | Wiese | 73/170.16 |
| 6,980,908 B2 | * | 12/2005 | McKewon et al. | 702/3 |
| 7,228,235 B2 | * | 6/2007 | Grzych et al. | 702/3 |
| 7,253,742 B2 | * | 8/2007 | Davis et al. | 340/606 |
| 7,295,933 B2 | * | 11/2007 | Gysling et al. | 702/45 |
| 7,340,353 B2 | * | 3/2008 | Gysling et al. | 702/45 |
| 7,430,924 B2 | * | 10/2008 | Gysling et al. | 73/861 |
| 7,602,285 B2 | * | 10/2009 | Sznaider et al. | 340/539.28 |
| 7,734,245 B2 | * | 6/2010 | Ravela et al. | 434/8 |

* cited by examiner

*Primary Examiner* — Lisa Caputo
*Assistant Examiner* — Jermaine Jenkins

(57) ABSTRACT

The invention is the use of a number of barometric pressure sensors roughly surrounding one or more target location or locations for which wind is being predicted. Based on a historical relationship between the observed pressures at the sensors and the observed wind at the target locations, the prediction of winds a few seconds into the future is possible. It is anticipated that these pressure observations used to train the prediction engine may be supplemented with some other local data such as area wind direction, temperature, and time of day. Further, in some applications the training of the prediction engine may be only prior to its use, while in other applications, the training may be updating the prediction engine while the instrument is operating. In the specification, a theoretical foundation for the pressure/wind relationship is explored for signal magnitudes.

4 Claims, 1 Drawing Sheet

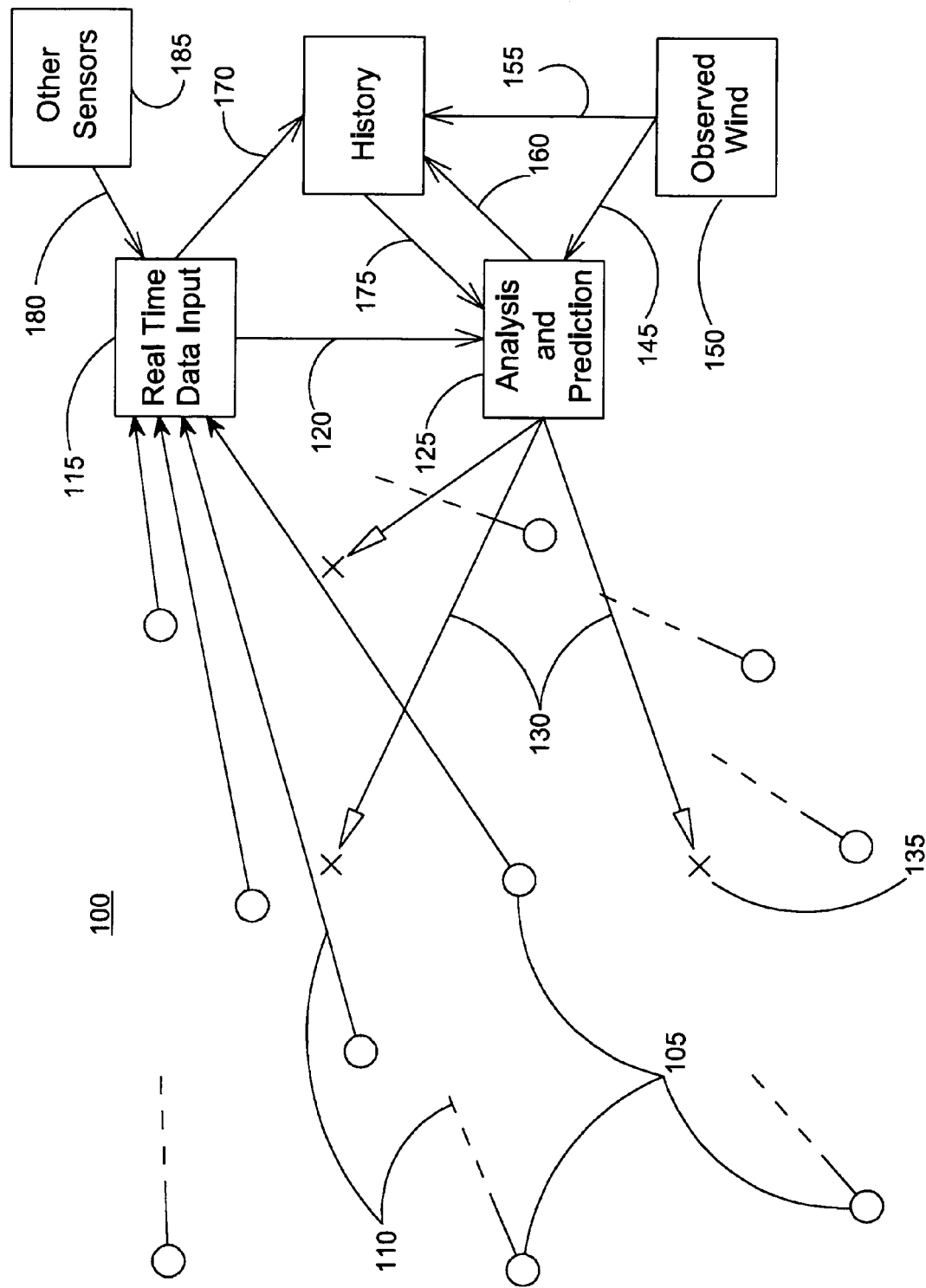

BERNOULLI WIND PREDICTION SYSTEM

BACKGROUND

To measure wind at a significant altitude is difficult. Yet many different types of groups want to do it for numerous reasons. Air racing, ballooning, rocketry, aerial spraying, and the current focus, windmills all need to know of the presence of wind gusts high in the air. The standard method is to erect a tower and place cup anemometers at the appropriate heights. If information is wanted at more than one location, then a tower has to be erected and maintained at each location. These towers are expensive and expensive to maintain. Because of the expense, and because they interfere with the immediate wind regime only a limited number if them are used in a wind farm and are generally not used to collect data to dispatch the turbines.

In the application of windmills, for example, the current practice is to have each turbine control itself based on the power it is generating, and the wind it is measuring on the nacelle of the same turbine. The problem is that these nacelle-mounted instruments are behind the rotor blades. The turbines can adjust to different winds if they knew what the incoming winds were a few seconds before the arrived at the rotors. Providing this information economically is a primary focus of the invention. The invention is designed as an easily maintained low cost way to provide wind speed change information a few seconds before the wind hits the turbines without the use of towers. This will allow them to adjust the blades (or transmissions) in gusts to reduce stress and subsequent O&M while making the turbines operate more efficiently.

Likewise, with ballooning, when filling and releasing balloons it would be best if the air above were quiet. A method is needed to see aerial winds a number of seconds before releasing. Hang gliding launches are much easier on an up-wind gust if it can be foreseen. This new method addresses this need giving a 2-10 second estimate of wind gusts intensity, and direction. The same problems exist with model rocketry, small plane racing, and similar aerial sports. For these markets this new invention likewise will give a recording of wind gusts that will or might have interfered with activities.

In summary, there is a need to have a method of estimating wind gusts a small number of seconds into the future. This invention addresses that need with an economical ground based system.

OBJECT OF THE INVENTION

Simply put, this invention has as an objective to observe reliable relationships between pressure patterns observed on the ground and aerial gusts overhead. Using historical records of these correlations, or temporal relationships, between pressure patterns on the ground and subsequent wind gusts aloft, an objective is to predict the imminent occurrence of wind gusts for the turbine controllers. Specifically, this invention intends to use low cost ground based air-pressure sensors to detect patterns of air pressure to predict wind gusts 2 to 10 seconds in the future.

Expressed more formally: In a system where barometric pressure is being measured through time over an array including multiple pressure measurement positions, it is an object to incorporate local near-ground pressure measurements and their recent time-histories into a statistical analytical model, to infer wind patterns propagating through space and to project those patterns into the near future for predicting wind speed at one or more selected points.

It is a further related object that the system incorporates pressure measurements and at least one set of wind velocity measurements to provide the parameters for (training) the aforementioned statistical analytical engine the near time-prediction of the wind velocity.

The continuous training feature of the modeling system is a still further object of this invention, allowing continuous updating of the prediction engine as time and measurements accumulate and local physical and large-scale meteorology changes.

In summary, the three objects of this invention serve to train a prediction engine to infer wind velocity patterns from pressure data as it is collected, and allow continuously updating of the statistically based estimation parameter set to capture changes in the relationship between the measured pressure and corresponding wind velocity.

BRIEF SUMMARY OF THE INVENTION

This Invention uses near-ground patterns of pressure readings to predict the winds at up to few hundred feet in elevation a few seconds in advance of their arrival at elevated target points. The estimation engine is trained by comparing predictions to subsequent observed wind at the target points using feedback. The statistical model may continue to use observed wind data to update the parameters of the estimation engine during its operation, but this is not necessary. While the estimation structure is based on physical principles, the calculated parameters estimates are statistical with the estimating parameter set heuristically determined in the field from the data.

Novelty and Uniqueness of the Application and Method

The present invention is concerned with wind velocity prediction at very small geometric scales, not more than a few hundred meters, and for very short time scales, typically ten seconds or less. Existing art is primarily concerned with larger scales in both space and time. The brief review provided here will give a frame of reference to both compare and differentiate the present invention from the prior art.

The Bernoulli equation relates energy conservation in fluids. It can be generalized to open systems, using the constraints on flow imposed by imperfect confinement by the momentum of the air. In meteorology, wind variations and pressure fields are related through conservation of energy balancing terms that include solar cell development, angular momentum on the rotating earth (Coriolis) and similar geographic scale determinants. At this large scale, the measurement of pressures is only a small component of weather forecasting. Barometers are used along with other instruments as much to see and to predict weather, hours and days in the future.

Pressure and wind are involved in wind prediction; at an intermediate scale (storm cell size) the wind momentum becomes a dominant parameter. At this "meso-scale" of cyclonic storms, pressure measurements along with many other variables are used to predict winds many minutes to hours in advance. The path of these storms and the ultimate strength, however is determined by even larger scale structures such as ocean temperatures, proximity, and the geostrophic flows in which they are embedded.

At an even smaller physical scale of say 60 meters and the short prediction times of say 4 seconds, the momentum of the air becomes a dominant term both causing pressure signatures originating in the air and allowing hem to be registered on the ground. Viscosity is not very important. The scale is too large for that. Momentum dominates and large weather forces are irrelevant solar heating, cellular development, Coriolis are all to large scale. The patterns that are relevant to very short term wind prediction, typically under one minute and in many applications under ten seconds, are related to correspondingly small geometric scales: of dimensions comparable to the distance that the air travels in the period of concern for wind velocity prediction. Thus, for wind predictions up to ten seconds, and with wind speeds typically under twenty meters-per-second (for example), a relevant distance scale for measurement data is of the order of (6 seconds)×(10 meters/second)=60 meters.

This invention predicts winds from patterns of pressure observations at the 10 to 100 meter—2 to 10 second scale. The sensors form an irregular array of air pressure sensors extending that far in a prevailing upwind direction, and by similar of similar distances in other directions, will generally suffice to give the needed approximate predictions of wind velocity.

This invention differs from prior art in the following ways:
Physical Scale: Winds are predicted over a distance of less than a hundred meters of air travel,
Time scale: Predictions are for only 4-6 seconds into the future, and
The relative importance of pressure patterns as the primary measurement variable and finally,
The reliance on the use of feedback for correcting prediction is new.
These will be discussed next in the above order.

PRIOR ART

First: a Small Physical Scale

First, this invention predicts only at a few very specific points by using air pressure sensor data from near the ground less that a few hundred meters from the target prediction point. At this micro, if not pico, scale, momentum, surface geometry, wind velocity, and friction are the controlling factors and the pressure signatures on the ground are the result of energy conservation in incoming gusts and turbulent flow. The pressures engendered by the turbulent atmosphere are utilized as data as it encounters friction with the irregular ground under the driving pressure of winds further aloft. This is fundamentally different from weather prediction in that, weather prediction is the prediction of the consequences of large geostrophic flows induced by large-scale patterns of solar heating. That heating causes large-scale slowly changing pressure differences and winds controlled by Coriolis effects and a myriad of other variables discussed below. In the regime of this new art, the geostrophic wind is the exogenous force causing turbulent surges of pressures as it encounters friction with the ground.

This system is differentiated in time and distance scales as will as method from the art of predicting cellular, funnel or small squall development typified by Advanced Regional Prediction System (ARPS) under development out of Oklahoma over the past 10 years. The ARPS system is designed toward predicting larger atmospheric structures, typically hundreds or thousands of meters across, at about 15 minutes to a half hour in advance—far larger and longer than the time scale of interest here.

Second, a Short Time Scale

The time scale of the disturbances being measured with this Bernoulli System are 2-10 seconds, focusing on about 4 seconds into the future. There are no commercial turbulence schemes for this time range, and specifically none that are designed to give changes in speed of wind based on detection of pressures on the ground.

In summary, the pressure signatures across the ground are caused both by the incoming forces of the turbulent air gusts as well as the related pressure signature from the fact that the faster the air is moving, the lower the pressure is to conserve energy. If in near real time, the pattern of pressure on the ground can be measured, this system will use that information to tell something about the moving air above it and at points nearby. This invention performs exactly that way: by carefully analyzing the pressure patterns on the ground, the winds can be a statistically predicted at a particular points in space in the very near future based on seeing the same patterns before.

Other Prior Art of Similar Time and Physical Scale to the Invention

Wobben (U.S. Pat. No. 7,025,567) has taught that one can predict downwind wind from up-wind observations. His art is of the same physical and time frame as the invention proposed here. However, his methods and variables used are different. In the case of this new invention, This new art makes several major changes on that idea: first, wind is predicted at a specific point many meters above the ground, from the surrounding pressure measurements on the ground—not Wobben's wind aerial measurements. The pressure sensors will be located both upwind and down wind as well as the sides of the target.

The conceptual difference between this patent application and Wobben is that his patent assumes that a change in wind moving from one direction will proceed in a linear direction, somewhat as a flood of water. The efficacy of this model was studied and dismissed years ago by RISO in Denmark with a series of wind measurements on met towers arranged up-and-down wind. (See Sorensen, Hansen, Iov, Blaabjerg, & Donovan, Wind Farm Models and Control Strategies RISO report E-1464(EN) August 2005).

This art is unique in that it uses a large pressure field under the incoming wind turbulence as it is observed on the ground in an area of study. This includes pressure signatures downstream being considered for analysis along with upstream sensors physically completely different from Wobben.

A Third Difference from Prior Art: Model and Parameter Structure

Prior art for weather prediction relies on many more variables than the present proposal, and utilize only on gross approximations and rough empirical constructs interpreted by integral parts of the prediction system.

Complex Multivariate Model for Weather Predictions

The oldest and most developed art relating to wind prediction is the field of synoptic meteorology, more commonly known as weather prediction. This prior art combines analytic aspects and a statistical history of empirical observations, with a goal of predicting not just wind speeds, but more often temperature, cloud cover, relative humidity, precipitation, and related information, for various locations on the earth, based on multiple inputs ranging from ground-based sensors to radar and satellite maps.

The physical principles underlying this art are complex, involving solar and thermal-infrared radiation patterns and their interaction with absorbing and re-radiating surfaces of varying albedo, from lakes and oceans to forests, fields, and paved-over urban areas; transport of energy through evaporation, condensation, and sublimation of water, including evaporation, evapotranspiration (from plants), condensation in clouds, fog, and rain, and sublimation to and from ice and snow particles; absorption and blocking of radiant energy by water vapor (particularly at infrared wavelengths) and condensed water droplets (clouds and fog) and ice crystals (snow and sleet and ice-particle clouds); absorption, storage, and release of thermal energy on different time scales involving oceans and lakes, fields, grasslands, forests, deserts, etc.; physical barriers and impediments to wind flow ranging from rough terrain to mountains and valleys; very large-scale patterns including solar-heated tropical regions interacting with colder polar regions under the influence of coriolis acceleration and large-scale patterns of thermally relatively uniform oceans and thermally much more variable land masses; the physics of heat and vapor transport by conduction (of heat), diffusion (of vapor), wind (of both and vapor) and turbulent mixing (of both heat and vapor); and the related physics of gravity, pressure variation with height, associated adiabatic heating and cooling when there are vertical air currents; and condensation, evaporation, and sublimation driven by these adiabaic thermal effects and interacting (in turn) with visible and infrared radiation.

This list of effects, which is both long and far from exhaustive, is provided to point out the richness of the parameters used for weather and prediction in contrast to the near singular focus on pressure arrays in the invention proposed. In this new art, pressure data from sources is used extensively, and other possibly measured variables such as area temperature or general wind direction are of far lesser importance and may not be used or useful at all.

Humans Predict Weather. The phenomena just outlined in the previous paragraphs for predicting weather are understood and physically modeled only partially and approximately, in computer simulations that rely on gross approximations and rough empirical constructs. The underlying physical phenomena are far too complex, chaotic, and fine-grained to model in a deterministic fashion, even with super-computers. Aside from the overwhelming complexity of the physical model there is a measurement issue: the current "state" of the weather system is measured only at a few isolated points (at weather stations) and via coarse-grained maps (radar, satellite cloud cover images, etc.) Weather stations typically record solar insolation, temperature, relative humidity (e.g., from wet-bulb and dry-bulb temperature) cumulative precipitation (in water depth and snow depth), and wind speed and direction, at the earth's surface or at the slight elevation of a met tower mast, at a few isolated points at the bottom of the vast three-dimensional volume of the atmosphere. Radar and satellite imagery provide indirect indicators of the state of the atmosphere, or of conditions on the ground (infrared radiation, albedo, etc., if not obscured by cloud cover).

A relatively complete predictive physical model of weather would require a description of the state of the atmosphere through its entire depth and over a large geographic area, along with a description of the mountains, ridges, valleys, areas of rough terrain, smooth terrain and ocean, etc., that constrain and shape the evolution of the modeled physics. In practice, "deterministic" physical atmospheric modeling has until recently been a minor component of weather prediction, which has been based much more strongly on statistical inferences. Given an observed pattern of measured winds, temperatures, cloud cover, precipitation, snow cover (if any, affecting albedo), etc., the forecaster asks: what past data sets resembled the current data set, and what weather patterns were observed to follow in subsequent hours and days for these past data sets? The predictive model is a kind of "postdiction" statistically based on the histories of previously observed and measured weather patterns.

Thus, imagine that from a large data set of past weather history in a region, a subset of that data set resembles the presently-measured weather pattern, and for that resembling subset, precipitation was observed to take place on the following day in 30% of cases. Then the meteorologist may predict a 30% chance of precipitation for the following day, assuming that the underlying, perhaps largely unknown patterns of causation will play out in the near future similarly to the past. That computer-statistical prediction may be adjusted according to the meteorologist's highly-trained "intuition", which effectively represents a complex neural model whose mechanisms are largely unknown, even to the meteorologist making the adjustments.

In summary, there is no relation between synoptic meteorology and this new pressure based statistical system. In the proposed invention, the observed pressures due to local momentum and convection processes are used to forecast immediate winds at the 40-100 meter scale. In contrast, weather prediction involving the terms cited above have no significant influence on micro-scale short term atmospheric events, except as such large scale effects provide the atmospheric boundary turbulent energy that "drives" a micro-scale predictive model.

Even at the at the meso-scale (storm cell) analyses in the literature such as the summary article describe by Ming Xue, Kelvin K. Droegemeier and Vince Wong, The Advanced Regional Prediction System and Real-time Storm-scale Weather Prediction (Pre-print, Center for Analysis and Prediction of Storms, Presented at International Workshop on Limited-area and Variable Resolution Models. Beijing, China, October, 1995), the physical and time scales are too long to be useful for the purposes served by the Bernoulli System.

A Fourth and Final Difference from all Prior Art, Feedback

A specific differentiation factor from all of the above art is that the proposed system uses real-time feedback from the target point or points to define and optimally refine the prediction mechanism. This feedback allows incorporation into predictions of all local factors that are measured in seconds and feet, thereby adapting the wind estimation engine dynamically to local micro-meteorological conditions. Wind estimation errors from the predictions are used in real time to refine the estimation parameters. Two modes are proposed: Train and Leave (TL) and a second mode where the estimation parameters are Continuously Updated (CU). Both models use feedback for training, but the CU model continuously trains as long as the system is in operation. Because training takes a long time, the TL approach may make sense where gathering wind data is expensive such as in the applications 1,2,4,5 below, or in a large geographical wind survey.

USE OF THE INVENTION

The real time wind prediction is sold to people using rapid communications since the predictions are typically for less than ten seconds into the future. Possible users:

1. Airport runway operators who need a shear wind or turbulence predictor,

2. Rocketry hobbyists interested in where their rockets will go,

3. Windmill operators interested in at-hub wind predictions,

4. Hang glider flyers interested in using elevated wind puffs to get aloft, and

5. Other similar, short term, prediction users such as balloonists, large and small.

DETAILED DESCRIPTION OF THE INVENTION

Pressure and velocity of air are related, even in an open system, by the reality that air has mass and cannot change positions or velocity without a change in pressure. Expressed differently, the air is partially confined by its own momentum. As wind changes speed in concert with pressure changes in the atmosphere, there is a consequential signature of those changes in the pattern of pressure changes on the ground. The Bernoulli principle supports measuring pressure patterns on the ground to predict wind changes high in the sky. It is clear to those familiar with demonstrations of the Bernoulli principle that pressure and velocity of a confined fluid are related. In this case, a fluid, the wind can "escape" in many directions under the influence of pressure. This "unconfined" nature of wind would seem to defeat the concept of ground pressures relating to aerial winds. The following discussion addresses this concern first by discussion, then by two analogies, and finally by decomposition of the physics into its two major physical components, along with numerical estimations of the magnitudes of the effects.

The size of the observed pressure changes are generally smaller than those that would be observed in a physically confined system, but such pressure changes are commonly observed by sensitive instruments and are the source of data for inferring wind patterns aloft. By observing over time the patterns of pressure around a prediction point, one can use this historical information to predict the future. The direct relationship to an actual physical model is not necessary, nor practical, while multivariate statistical estimation will serve the purpose of characterizing at least the horizontal component (relative wind-speed) of the three dimensional changes in wind structures from the two dimensional patterns on the ground. The following are two analogies that may be useful to understand this possibility.

A Geophysical Analogy

Much of geophysics uses two dimensional surface measurements to estimate underground three dimensional structures. Surface resistivity, or impedances, at different scales are used to estimate the size and conductivity of an ore or water body far below the surface. Arrays of surface gravity, chemistry, and solar wind induced electrical currents among many others, are measured, and used to estimate three dimensional structures below the ground.

In this invention, the two dimensional pressure patterns on the surface will be used to predict wind changes or shear in a third dimension—that is high off the ground, just as the geophysicist uses surface two dimensional arrays to estimate three dimensional structures under the ground.

An Acoustic Analogy

Assume that high in the air is a gust of wind which causes or a change in pressure. The critical question is whether that pressure change will be detectable on the ground far below it. Consider sound. If a sound happened at 100 meters in the air above an observer on the ground, would it be detectable on the ground? In general yes, with reasonable assumptions about magnitude. Think of a wind gust and its associated pressure change at altitude just as ultra-low frequency sound—to be detected with very low frequency microphones called pressure sensors. This demonstrated a well-known case where remote pressure changes are detectable on the ground.

Further, conceptually is it possible to determine the location and perhaps motion of the sound source given a number of microphones. We do it constantly with only two ears. Similarly, we can determine the movement of the ultra low frequency pressure waves propagating from air gusts using arrays of pressure sensors on the ground.

This sound analogy is useful because it points out the actual limitation of the proposed system. As the "frequency" content of the air gust goes down, the wavelength goes up. This will limit resolution of the gust structure dimensions. This is a severe limitation for binaural human hearing, but is managed in this invention by the large number of pressure sensors enveloping spatially the target estimation points and their statistical combinations. To use radio terminology, we have a long wavelength multiple-aperture sensor array for pressure phenomena of shorter wavelengths.

The Mathematical Theory

The core of this patent is a heuristic statistical analysis and estimation procedure between a number of pressure readings and wind at one or more points. Nevertheless, as discussed above, it not obvious at first review that the idea that pressure signatures on the ground can reflect gusts or wind changes above them will work, although the author has extensive field data relating observed wind and pressure variations using pressure sensors able to reliably record 0.1 Pascal resolution readings every 0.7 seconds.

To give theoretical substance to this idea, the following fluid dynamic analysis is presented. The fill set of fluid mechanics equations are not presented here, carefully arguing the deletion of term after term Rather, historical references will be used to identify the needed assumptions and the resulting key equations using the names of the scientists who first explored them.

The Navier-Stokes Model

In the present specialized system, short-term-future wind velocity is to be predicted at one or more locations, based on measurements from an array of pressure sensors and a physics-based model relating pressure patterns to wind flow patterns. To start, all earth-scale terms such as Coriolis and weather-scale terms such as radiation and cellular stratification are ignored due to physical scale. The Navier-Stokes (NS) equations for incompressible fluid flow successfully describe wind flow patterns observed here. Some term of these equations (such as the equation of state and viscosity terms) can be ignored for the present purposes due to temporal scale and, as argued elsewhere, so can larger scale, longer wavelength phenomena such as Coriolis forces and large solar-atmospheric structures.

The three-dimensional unsteady incompressible form of the NS equations defines constraints of continuity (air mass is neither created nor destroyed in this obviously non-relativistic system) and conservation of momentum. They also include so-called convection terms, which concern the relative motion between the observer and the moving air mass. A downwind translation of air movement patterns is associated with the so-called "convection" terms of the NS equations. The above-mentioned (in the Background section) system by Wobben (U.S. Pat. No. 7,025,567) was oversimplified in that it considered only downstream translation, or convection of wind velocities, while ignoring the evolving momentum dynamics of and being applied to the air mass.

In the present system, a downstream correlation of pressure change with wind speed change will be augmented with a cross-stream correlation of pressure change with direction change in the wind stream path, and with a correlation of moving pressure depressions with ground-connected vortex formations traveling with and also interactively perturbing the pattern of wind flow. Wind speed changes, at a windmill or anywhere else at the time frame and physical scale being addressed, are modeled by two general sets of terms in the NS equations:

1. Frame of Reference—air already in motion crossing the observer: To an observer on the ground, the wind speed is observed to change as air moving at different speeds is swept by the observer by a larger flow. In this case the pressure changes because of a change in the speed of a parcel of air, or at a different frame of reference, not moving with the air by a change of the position of the observer in that air mass as it passes.

2. Pressure gradient—Momentum conservation relates pressure and wind acceleration.

This section will close with a brief discussion of the data, and then a discussion of these two different effects. The first will be the Frame of Reference (FOR) terms and arguing how the observed pressure is affected by a speed change in air. Second the classic pressure/acceleration relationships will be discussed by putting some realistic numbers on the magnitude of the pressure/wind speed relationship. And finally, these two sets of terms will be compared in magnitude and how these pressures are conveyed to the ground for observation.

The Pressure Data

Pressures are measured using an irregular array of locations across the ground over an area comparable in size to the longest prediction periods times air velocity of interest. Above-ground tower measurements of pressure may optionally be incorporated if available. The array of locations may be irregular but of a placement to capture the ground signature of the pressure variations on an incoming wind gust. The pressure measurements need not reflect absolute barometric readings, but may reflect pressure changes relative to a reference pressure, whose absolute value need not be known but is considered fixed over the prediction period of interest.

The wind velocity is predicted and the actual wind can be measured from moment to moment for training or calibration. Optionally this training can continue after the baseline data is established, which also allows for ex post evaluation of the system accuracy.

The analysis of flow acceleration is divided conceptually into two terms: the first accounts for the point or frame of reference with regard to a static stream of air expanding and contracting and the second addresses changes in the air speed itself.

Bernoulli Energy Balance

In the first case, where a stream of air contracts the velocity is higher, and the pressure is lower. As this stream passes over the observer, the observer sees a changing wind speed and pressure. The equations below relate the pressure and velocity of the wind as seen by an observer on the steady stream, or by a fixed observer observing a passing jet of air. In a fixed coordinate system, accounting for both acceleration and convection (i.e. the continual translation of the measured air mass), the pressure along any given streamline is governed by the well-known Bernoulli equation:

$$P=P_0-\tfrac{1}{2}\rho U^2 \text{ The Bernoulli Pressure (not due to acceleration)} \quad 1]$$

where $P_0$ is the stagnation pressure, referred to as zero velocity, and $$U^2=U_x^2+U_y^2+U_z^2 \quad 2]$$

that is, the square of the velocity magnitude "U" is given by the sum-of-squares of the vector velocity components. In this system considered near the confining surface of the ground, the vertical velocity component $U_z$ is generally considered relatively small and is therefore provisionally ignored in the following discussion.

Eq. 1 applies to variations in pressure along a streamline in a fixed coordinate system. Ignoring the z-coordinate and considering variation along a short length du=dx+dy along a path coordinate "u", then differentiating Eq. 1 along that path, and ignoring unimportant path variations in density, yields:

$$dP/du=-\rho U dU/du \quad 3]$$

or along any streamline path "u":

$$dP=-\rho U dU \quad 4]$$

Thus, measured pressure variations along a streamline are interpreted in terms of density, velocity, and variation in velocity along the streamline. Energy is conserved in open space and the pressure/velocity signatures on the ground will be observed.

The streamlines, so often visualized in the Bernoulli exposition here are dynamic, but determined by the physical constraints of the estimation space and the density of air. In gust wind, the streamlines are "restrained" by the air's momentum creating shear. This momentum confinement allows the pressure to reflect velocity to maintain energy. Specifically, if a jet of air moves across the observer, the observer will detect a change in pressure, even with the jet maintaining a constant shape and velocity profile. This is the Bernoulli energy balance.

The Bernoulli equation applies only along a streamline and says nothing about variations in the streamline caused by outside forces. Now, if there is an imposed change in pressure, the wind speed will change. The applicable equations in the NS set conserve momentum are called the momentum equations and are discussed next.

The Pressure Gradient, and the Momentum Conservation Equations

To complete a two-dimensional picture at this scale, one needs the three dimensional momentum equation relating the pressure gradient to the curvature of streamlines. With "du" representing a path increment along a streamline, let "dv" represent an increment of distance across streamlines, and let "dV" represent wind velocity variation in the "v" coordinate direction, indicating curvature of the wind stream path "u". Then:

$$dP/dv=-\rho U dV/du \quad 5]$$

Note that the symbol for partial differentiation, "∂", may be substituted in some of these equations for the differentiation operator symbol "d", where it is recognized that the differentiated term is a function of variables other than the one specified in the differentiation.

Eq. 5 is a continuum statement of Newton's familiar equation, "force=mass*acceleration." Pressure "P" is a force per unit area, so the pressure gradient "dP/dv" has the units of force/volume. On the right-hand side of Eq. 5, density "ρ" is mass/volume, and the product "U dV/du" is "velocity·velocity/distance" which is "velocity·(1/time)" which is acceleration. Multiplying both sides by the unit volume yields "force=mass·acceleration." The direction of V is determined by the physical conditions and constraints on the velocity field that are unchanging over the estimation period. Further, assume that these same physical constraints determine the dV/du term, as it is in essence the deflection of the wind.

A change in wind speed and the consequential pressures from momentum changes will be visible at ground level. This effect is observed commonly as large-scale wind turbulently piles into the ground and is decelerated, increasing local air pressure. It is easily observed in the 10 to 100 Pascal range of HVAC instruments during a wind storm. To illustrate the magnitude of the pressure effect in the context of a windmill, the following example examines the relationship between observable pressure and wind speed.

Comparison of Pressure Magnitudes

The Bernoulli Effect Magnitude

To compare pressure and frame of reference effects, suppose a 10 Pa pressure differential is measured from one place to another in a prevailing wind of 5 M/S. What change in ½ density×velocity^2 gives 10 Pa? The density of air at sea level, 20 Celsius, is about 1.2 Kg/M^3. At higher altitude or higher temperature, the density is lower. For numerical convenience, assume we're on the plains of the US at air density of 1.0 Kg/M^3.

Noting that: 1 Pascal=1 Newton/M^2. So, with Density=1 Kg/M^3 and base velocity=5 M/S, the Bernoulli pressure is:

½×1×5^2=½×25=12.5. Pa. That's actually a negative 12.5 Pa, a pressure depression associated with being in the 5 M/S flow, as compared to non-moving air at a reference gauge pressure of 0 Pa. Again easily measured even if only 10% of the pressure change reaches the pressure array, What velocity change would lower the Bernoulli figure by an additional 10 Pa, to −22.5 Pa? Answer: a wind velocity change from 5 M/S to 6.7 M/S, by the time you are in a different packet of air or in a different part of the wind stream. Assuming a 1 Pa resolution of this jet on the ground below, this information would be invaluable for all the applications cited above.

The Momentum Effect Magnitude

Above, a relatively steadily moving stream of air was considered to which Bernoulli's equation could be applied, where the position of this air stream shifted to bring a higher- or lower-velocity portion over the observer. The fluid accelerates in places that the air stream contracts, for example to go through a gap between hills or buildings, but it is considered that the pattern of airflow itself is relatively stable, though that pattern might be carried across the ground by a larger prevailing wind, for example, a small whirlwind, of relatively stable shape, being carried across the ground by a larger moving air mass.

Now instead of considering a flow pattern that is "steady" in some frame of reference, which could be static or moving with a larger air mass, consider an unsteady pattern, where air is being accelerated by a new pressure gradient caused by an external change in conditions. Specifically consider a hypothetical pressure gradient along the x-axis, dP/dx=1 Pa/M. That gradient, acting on the two ends of a 1-meter-cube of air, would exert 1 N on the 1 Kg air mass contained in that cube, causing an acceleration of 1 M/S^2. This illustrates how acceleration depends on the pressure gradient.

Assume that the wind speed change is induced by something going on up above a windmill (or other application), which causes a barometric depression to move to the downwind side of the windmill. It's not important what caused it, most likely turbulence driven by the interaction of the geostrophic flow with surface roughness. Assume a wind is moving along at 5 M/S. Over a period of 10 seconds, it accelerates to 6 M/S. That's a sufficient change, with a sufficient rapidity, to be of interest for wind turbine control. Assume the distance scale for the barometric change is 100 meters (sufficient to affect the volume of air around an 80-meter tower and create an effect across the entire swept rotor).

A 1 M/S change in wind speed over 10 seconds, gives an acceleration=0.1 M/S^2. This implies a pressure gradient of 0.1 Pa/M. That gradient, extended over a geometric scale of 100 M, amounts to a total pressure change of 10 Pa. Now imagine two pressure sensors spaced 100 M apart, 50 M in front of a wind turbine and 50 M behind it, and imagine that these two instruments register a total pressure difference of 10 Pa. If this is a new disturbance, causing the flow velocity at the windmill to start changing, then the air flow past the windmill will accelerate (or decelerating, depending on direction of the pressure gradient) at 0.1 M/S^2 and, if this pressure change persists for 10 seconds, the cumulative wind velocity change will be about 1 M/S, for example, from 5.0 to 6.0 M/S.

The pressure change that affects the wind stream through the wind turbine in this way might not be detected fully at ground level. Current field instrumentation in use by the author senses pressure changes less than 1 Pa change every second. Excursions of 4-20 Pa are normal in an open field with a modest wind blowing.

In Summary

This invention is realizable because of two comparable pressure signatures that are easy to measure with modern solid state sensors. The similar order-of-magnitude changes in wind speed (5.0 to 6.7 M/S, and 5.0 to 6.0 M/S) from the above two hypothetical examples of two completely different effects demonstrate the magnitude signal to be observed. Thus for the scale interest to the applications cited, these effects are both important: both "convection" changes due to stable flow patterns being carried downwind, and non-steady acceleration effects.

The Bernoulli effect has little or no signature on the ground if the change in velocity of a jet of air is above and remote from the ground sensors. However, if a jet of wind is connected to the ground, the Bernoulli pressure of the rapid air movement will register with ground-level pressure sensors, even though the boundary layer caused by ground clutter might considerably reduce the wind speed at the pressure sensor. To understand why Bernoulli pressure is not strictly linked to wind speed in the earth's boundary layer, recall that the Bernoulli equation is an expression of energy conservation. Wind shear and obstruction-induced turbulence at ground level dissipate energy, so Bernoulli's energy conservation assumption is violated close to the ground. A ground level pressure sensor, at least to some extent, can "see through" the lowest tier of the boundary layer and detect pressure changes from wind flow patterns moving just above, and bounded by, the ground and its boundary layer.

By analogy, a wing develops lit (negative pressure) from the rapid flow above the upper airfoil surface, even though the flow velocity approaches zero deep in the thin boundary layer, approaching the airfoil surface. Thus the wing, airplane, wind turbine, hang glider etc. "sees through" a boundary layer to function. Similarly, our pressure sensors, situated well within a boundary layer can see through to the wind related pressures above.

In the realm of Bernoulli pressure and air movement patterns being carried along with a prevailing wind, observe that these "convection" changes arrive at a site of interest, such as a wind turbine, from upwind. Unsteady wind accelerations, by contrast, can be induced by moving pressure forces whose downwind components are as significant as the upwind components. Again, in contrast to Wobben' useful pressure sensor data is used from both the upwind and downwind sides of a wind turbine.

By analogy, consider that wind will blow from high pressure to low, so down wind pressure is as important as upwind pressure in induce an accelerating flow. Consider further, that a windmill blade or a hang glider's wing respond to differential pressures to create lift; the wind is simply the media in which this pressure differential is produced.

With the momentum effect, a change in pressure will be observed on the ground as it is transmitted to the ground through the air column. Proximity will make the effect on the ground larger, and the shape of the pressure impact patterns will relate to the structure and magnitude of the incoming pressure gradient. Thus, over a broad range of conditions, pressure signatures will be registered on the ground from air velocity changes above as can be seen in the field. In nearly all situations, these effects will not be differentiable and certainly not reducible to terms in a closed-form calculus. That is not important in that analytical engine in use is statistical, not analytical. Suffice it to be that a pattern of ground measures can be correlated with aerial gusts, predictions of shear and winds can exist. Whether or not these can robustly determine wind gust structure at a large height is to be determined with statistics. To close, in most of the proposed applications, the certainty of the estimate will also be available for use.

BRIEF DESCRIPTION OF THE DRAWING

FIG. 1 schematically represents a physical layout of pressure sensors, data collection and processing, and wind prediction outputs directed to target locations. This is referenced in the next section.

DESCRIPTION OF A PREFERRED EMBODIMENT

Physical Embodiment

To make this invention requires the spreading of a number of telemetering pressure gauges out around the point of interest. Data is also returned via a near-real-time data link from the prediction point for training the prediction engine. Then, in use, atmospheric pressure data is gathered in real time and used with the parameters derived from the historical data to predict wind changes at a point in space in the future.

A second embodiment would be to have, at or near the target place(s) for which the system is predicting, a wind speed sensor to collect actual wind and store it along with the predicted wind. This additional data could be used for continuous updating of the calibration of the system.

A third embodiment would utilize other environmental data from the area such as additional pressure sensors, and area data such as time, humidity, wind direction, or temperature information.

Schematic Embodiment Description

The "dataflow" of functional structure of a preferred embodiment of the invention, and the corresponding data pathways, are described with reference to FIG. 1. FIG. 1 shows, schematically, a typical physical layout of a prediction system 100 for very short-term wind prediction, based on data from a pressure measurement array and training data from wind sensors at target locations. The figure indicates systems for data collection and consolidation, modeling, and prediction.

Circles 105, and similar, represent air pressure sensors at various locations in the array. The sensors need not be placed at regular equally spaced locations, and in practice the locations are likely to be chosen for convenience (e.g. avoiding problems such as animals, farm plows, and theft) and because experience with similar systems indicates especially favorable locations for sensor placement.

For example, in a system for optimizing wind turbine performance, sensors placed up-wind in a prevailing wind direction are likely to provide particularly useful information (due to the presence of the Bernoulli terms), so that more sensors might be placed at prevailing-upwind points. However, downwind measurements are also valuable for predicting non-convective exogenously induced pressure excursions and wind accelerations. The targets are surrounded by a sufficiently broad and dense set of pressure sensors o allow estimation of the height and size of an incoming gust. All sensors are connected via data links 110 to a subsystem 115 for real time data input and consolidation. Some of links 110 are indicated by arrows, while to avoid diagram clutter, other links are indicated by partial solid lines ending in segments of dashed lines, the direction of these solid and dashed lines pointing generally toward 115. It is understood that these links can consist of data-carrying media, for example twisted pair wires, or wireless data communication means, as with radio waves. It is understood that the pressure sensors are going to need power, which can be provided by any of a number of means (not shown) including replaceable batteries, rechargeable batteries, wires, battery/solar cells, etc.

The incoming pressure data are collected and stored momentarily for analysis. The primary path for pressure sensor data is via 120, to a prediction engine 125. Paths 130 and similar, from the prediction engine 125, indicate paths for predicted wind velocity data to target locations 135, indicated by "X" symbols, where the predicted winds apply. The predicted winds might be transmitted to an array of actual locations, for example, rocket or balloon launch sites, wind turbine control systems, or the use of the data might be incorporated into software in the same computer in which the prediction engine (125) is implemented, in some combination of hardware and software.

Winds are measured at the same points 135 where they are predicted, so that statistical methods may be applied to minimize differences between predictions and measurements. The observed wind velocity measurements are collected at 150 (data links from points 135 not shown), and these measurements are transmitted via link 155 to history repository 165 (which might be simply other data addresses in the same computer system). The locus and equipment 150 may share the hardware of a data acquisition system that also services the functions of data input locus 115. The separation of locations 150 and 115 is for conceptual purposes, not necessarily indicating separate hardware.

Other data such as time, temperature, wind direction, relative humidity 185 may also be collected and delivered via 180 at module 115 and incorporated via 120 into analysis and prediction 125. The collected observed pressure and other data from 115 couples via data path 170 to a functional module 165, where the pressure data and data from other sensors 185 are recorded, along with the wind data arriving via 155. Path 160 from prediction engine 125 to history module 165 indicates that a past history of predictions from 125 may be recorded along with the wind observations from 150, leading to refinement of the prediction engine based on the pattern of recent prediction errors.

In any case, the history module 165 both records past history and performs statistical corrections to wind velocity predictions. The analysis and prediction 125 carries out ongoing wind predictions, while information from the history module via 175 corrects and refines the model of 125 over time.

These and other features of the present invention will be understood more fully in terms of the claims.

I claim:

1. A system employing pressure measurements from an array of sensors across multiple measurement positions for short-term wind velocity prediction, including:
   a) multiple air pressure sensors;
   b) at least one wind sensor at each target location used during calibration;
   c) data collection and information dissemination networks;
   d) a data management system;
   e) a statistical analysis engine to parameterize a wind prediction engine;
   f) a wind prediction engine that uses these parameters.

2. The system of claim 1, further including:
a) at least one wind velocity sensor operating all the time at the prediction target point(s);
b) an updating means to incorporate new parameters into the prediction engine.

3. The system of claim 1, further including
additional sensory inputs such as temperature, wind direction, humidity, or time.

4. The system of claim 2, further including further step of:
additional sensory inputs such as temperate wind direction, humidity, or time.

* * * * *